Dec. 5, 1933.　　　　　J. B. DOW　　　　　1,937,512

OSCILLATOR SYSTEM

Filed July 1, 1932

INVENTOR
Jennings B. Dow.
BY
*Robert A. Lavender*
ATTORNEY

Patented Dec. 5, 1933

1,937,512

UNITED STATES PATENT OFFICE 1,937,512

OSCILLATOR SYSTEM

Jennings B. Dow, Washington, D. C.

Application July 1, 1932. Serial No. 620,484

10 Claims. (Cl. 250—36)

(Granted under the act of March 3, 1883, as amended April 30, 1928; 370 O. G. 757)

My invention relates broadly to oscillator systems and more particularly to a non-regenerative type of oscillation generator.

One of the objects of my invention is to provide a non-regenerative type of oscillation generator having a high degree of frequency stability.

Another object of my invention is to provide a non-regenerative type of oscillation generator whose frequency stability is relatively free from the influence of the load circuit.

Other and further objects of my invention will be understood from the specification hereinafter following by reference to the accompanying drawing, in which.

The dynatron type of oscillation generator has long been recognized as having certain very desirable characteristics which make it especially suitable for certain uses such as in heterodyne frequency meters and other precision equipment. It requires but a single tuned circuit and is, for that reason, easily calibrated. Also, it is capable of holding its calibration over long periods of time. The dynatron oscillator has, however, suffered from the same deficiency that is found to exist in most other conventional self oscillators, namely;—its frequency of oscillation is seriously influenced by changes in the load circuit. In the circuit of my invention, the load, instead of being coupled in the conventional manner to the frequency establishing circuit, is coupled to an auxiliary circuit which, in turn, is associated with a tube element which forms no part of the oscillation generator per se. The circuit is arranged in such a manner that this last mentioned tube element is shielded electrostatically from that portion of the electron stream involved in oscillation generation.

Figure 1:
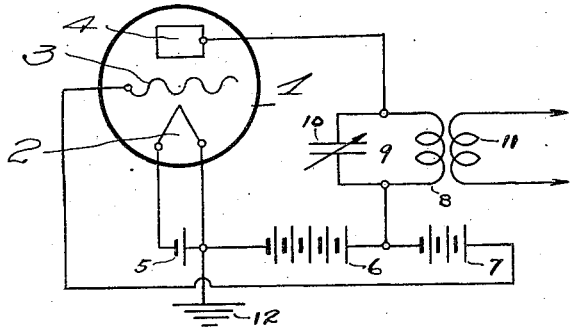
Fig. 1 shows a conventional non-regenerative type of oscillation generator utilizing a three element type of electron tube. Such an oscillation generator is of the well known dynatron type.

Fig. 1 shows a conventional dynatron type of oscillation generator having an electron tube 1 containing a cathode element 2, a grid element 3, and an anode element 4. The cathode is heated by battery 5. Batteries 6 and 7 in series connection supply the grid 3 and anode 4 at the proper potential with respect to the cathode. The anode potential is supplied through inductance 8 of resonant circuit 9 which is adjustable for determining the frequency of oscillation.

Resonant circuit 9 comprises inductance 8 and capacity 10 in parallel connection. Inductance 11 is coupled to inductance 8 for deriving energy from the system.

The circuit of Fig. 1 oscillates by virtue of the fact that for certain values of grid and anode potential, an increase in anode potential results in a decrease in anode current and conversely a decrease in anode potential results in an increase in anode current. By having a resonant circuit associated in a circuit having negative resistance, it is possible to sustain oscillations so long as the effective positive resistance in the system does not exceed a certain amount and provided at the same time, a suitable ratio of effective inductance to effective capacity is maintained. In most oscillation generators, it is customary to tie that portion of the system to ground or to the metallic box enclosing the generator, which has the largest inherent distributed capacity to ground or to the enclosing box. Such a connection is represented at 12 and serves to overcome certain undersirable effects of distributed capacity.

Figure 2:
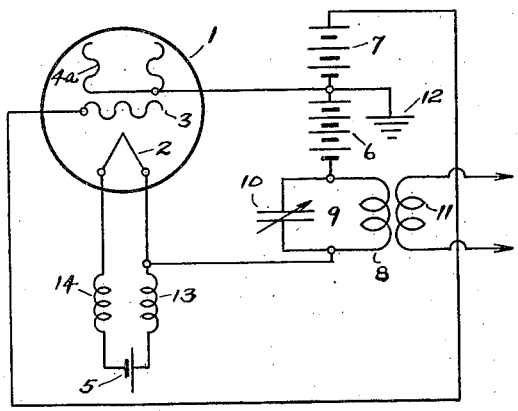
Fig. 2 shows a modified form of the circuit of Fig. 1.

The circuit of Fig. 2 is fundamentally similar to that of Fig. 1. There are, however, the following structural differences. Anode 4a of Fig. 2 is a grid-like structure in contrast with the simple plate 4 of Fig. 1. In the circuit of Fig. 2, the anode element 4a is tied to ground 12 with batteries 6 and 7 whereas in Fig. 1, the cathode and batteries 5 and 6 are tied to ground. Cathode 2 in Fig. 2 is supplied with heating current through choke coils 13 and 14. The presence of choke coils 13 and 14 makes it possible to tie battery 5 to ground through a blocking condenser if desired, although such a connection to ground is not shown as it is not desired to complicate the circuit beyond that which is necessary for an understanding of the development.

Figure 3:
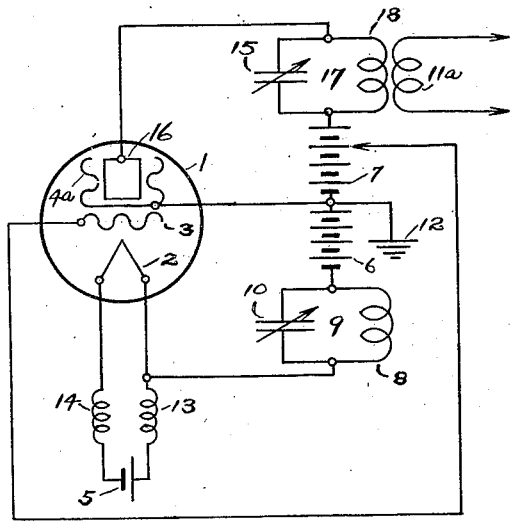
Fig. 3 shows one form which the circuit of my invention may take. The circuit of Fig. 3 will be recognized as employing a four element electron tube in contrast with the three element tubes shown in Figs. 1 and 2.

In the circuit of my invention shown in Fig. 3, I employ an oscillation generator of the dynatron type similar to that shown in Fig. 2. Instead of coupling the work circuit to inductance 8 of resonant circuit 9, I couple the work circuit 11a to inductance 18 of resonant circuit 17 which comprises inductance 18 and capacity 15 in parallel. Resonant circuit 17 is connected between a second anode element 16 and battery 7 which also supplies anode 16 at the desired potential with respect to grid-like anode 4a. Resonant circuit 9 determines the dynatron oscillator frequency whereas resonant circuit 17 may be tuned to the frequency of the dynatron oscillator or to a harmonically related one.

It will be recognized that that portion of the circuit of Fig. 3 corresponding to Fig. 2, controls the flow of electrons to anode 16, and that the grid-like anode 4a serves also to electrostatically shield that portion of the electron stream between cathode 2 and grid-like anode 4a from anode 16. This isolates the circuit included between anode 16 and grid-like anode 4a and the effect of such changes in load as are reflected into the system through coupling inductance 11a are not readily felt in the oscillation generating portion of the system. This serves to make the frequency independent of the load and results in a highly stable system especially when resonant circuit 17 is tuned to a harmonic of the fundamental frequency.

Resonant circuit 17 can be replaced by any other form of high impedance such as a resistance or inductance if desired. Also, while I have shown the cathode 2 supplied with heating energy by battery 5 through choke coils 13 and 14, any of the known methods of heating the cathode and at the same time permitting it to assume high frequency potentials with respect to the source of heating energy, may be employed.

While I have described my invention in certain preferred embodiments, I desire it to be understood that modifications may be made and that no limitations are intended other than those imposed by the scope of the appended claims.

The invention herein described may be manufactured and used by or for the Government of the United States of America for governmental purposes without the payment of any royalties thereon.

What I claim as new and desire to secure by Letters Patent of the United States is as follows:

1. A system for the production of alternating current energy comprising in combination an electron tube having a cathode element, grid element, and grid-like anode element and external circuits associated with said elements to form a non-regenerative type of oscillation generator exclusive of the action of a second anode element in said electron tube and an external circuit connecting said second anode element with said grid-like anode element, and a work circuit connected with said last mentioned external circuit for deriving energy from said system.

2. A system for the production of alternating current energy comprising in combination an electron tube having a cathode element, grid element, and grid-like anode element and external circuits associated with said elements to form a non-regenerative type of oscillation generator exclusive of the action of a second anode element in said electron tube and an external circuit connecting said second anode element with said grid-like anode element, and a work circuit coupled with said last mentioned external circuit for deriving energy from said system.

3. A system for the production of alternating current energy comprising means for projecting electrons through a grid-like anode element within an electron tube, said means comprising a dynatron type of oscillation generator, and an additional element within said tube serving exclusively to collect said electrons, in combination with an external crcuit connecting said additional element and said grid-like anode element, said external circuit comprising the output circuit for said system.

4. In a device of the class described, an electron tube having non-regenerative means including external circuits, a cathode, a control electrode and a screen-like anode, for causing said tube to operate with a negative resistance characteristic and for producing oscillations, means including an additional anode in said tube and an output circuit for delivering useful high frequency energy, and means for maintaining said additional anode electropositive with respect to said screen-like anode.

5. In a device of the class described, a discharge tube having an electron emitting cathode and two cooperating electrodes, means including circuit connections between the cathode and each of said cooperating electrodes for causing said tube to function as a non-regenerative oscillator having a negative resistance characteristic, means including an additional electrode within said tube and an output circuit connecting said additional electrode with said cathode for delivering useful high frequency energy from said tube, and means for maintaining a high frequency ground potential on one of said two cooperating electrodes.

6. A system for the production of high frequency energy comprising in combination an electron tube having cathode, grid and anode elements and external circuits associated with said elements to form a non-regenerative type of oscillation generator, said tube containing an additional anode element electropositive with respect to the first mentioned anode element and external circuits including output means disposed between said additional anode element and said first mentioned anode element for deriving from said system energy the frequency of which corresponds to that of said generator.

7. A system for the production of high frequency energy comprising in combination an electron tube having cathode, grid and anode elements and external circuits associated with said elements to form a non-regenerative type of oscillation generator, said tube containing an additional anode element electropositive with respect to the first mentioned anode element and external circuits including output means disposed between said additional anode element and said first mentioned anode element for deriving from said system energy the frequency of which is harmonically related to the frequency of said generator.

8. A system for the production of high frequency energy comprising in combination an electron tube having cathode, grid and anode elements and external circuits associated with said elements to form a non-regenerative type of oscillation generator, said tube containing an additional anode element electropositive with respect to the first mentioned anode element and a resonant circuit with output means disposed between said additional anode element and said first mentioned anode element for deriving from said system energy the frequency of which corresponds to that of said generator.

9. A system for the production of high frequency energy comprising in combination an electron tube having oscillation-generator-elements and circuits associated with said elements to form a non-regenerative type of oscillation generator, the said tube having an auxiliary element, an output circuit disposed between said auxiliary element and one of said generator-elements, and means for electrostatically shielding the electron path between said generator-elements from said auxiliary element.

10. A source of high frequency energy comprising a discharge tube having an electron emitting cathode and two cooperating electrodes, means including circuit connections between the cathode and each of said cooperating electrodes for causing said tube to function as a non-regenerative oscillation generator, means including an additional electrode within said tube and an output circuit connecting said additional electrode with said cathode for delivering useful high frequency energy from said tube, and means for electrostatically shielding the electron discharge stream between said first mentioned electrodes from said additional electrode.

JENNINGS B. DOW.